United States Patent
Perlade et al.

(10) Patent No.: US 12,486,551 B2
(45) Date of Patent: Dec. 2, 2025

(54) COLD ROLLED AND HEAT-TREATED STEEL SHEET AND METHOD OF MANUFACTURING THE SAME

(71) Applicant: ArcelorMittal, Luxembourg (LU)

(72) Inventors: Astrid Perlade, Le Ban-Saint-Martin (FR); Kangying Zhu, Metz (FR); Coralie Jung, Metz (FR); Frederic Kegel, Yutz (FR)

(73) Assignee: ArcelorMittal, Luxembourg (LU)

( * ) Notice: Subject to any disclaimer, the term of this patent is extended or adjusted under 35 U.S.C. 154(b) by 627 days.

(21) Appl. No.: 17/784,848

(22) PCT Filed: Dec. 16, 2020

(86) PCT No.: PCT/IB2020/062011
§ 371 (c)(1),
(2) Date: Jun. 13, 2022

(87) PCT Pub. No.: WO2021/124136
PCT Pub. Date: Jun. 24, 2021

(65) Prior Publication Data
US 2023/0002847 A1    Jan. 5, 2023

(30) Foreign Application Priority Data
Dec. 19, 2019    (WO) .................. PCT/IB2019/061102

(51) Int. Cl.
| C21D 9/46 | (2006.01) |
| C21D 6/00 | (2006.01) |
| C21D 8/02 | (2006.01) |
| C22C 38/00 | (2006.01) |
| C22C 38/02 | (2006.01) |
| C22C 38/04 | (2006.01) |
| C22C 38/06 | (2006.01) |
| C22C 38/12 | (2006.01) |
| C22C 38/14 | (2006.01) |

(52) U.S. Cl.
CPC .............. *C21D 9/46* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C21D 2211/001* (2013.01); *C21D 2211/004* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| 2005/0199322 A1 | 9/2005 | Nakamura et al. |
| 2009/0107588 A1 | 4/2009 | Sebastien et al. |
| 2013/0319582 A1 | 12/2013 | Yokoi et al. |
| 2015/0329950 A1 | 11/2015 | Azuma et al. |
| 2018/0371566 A1 | 12/2018 | Gospodinova et al. |
| 2020/0149129 A1* | 5/2020 | Beauvais .............. C23C 2/0224 |
| 2020/0347471 A1 | 11/2020 | Zhu et al. |

FOREIGN PATENT DOCUMENTS

| EP | 2631307 A1 | 8/2013 |
| EP | 2698440 A1 | 2/2014 |
| EP | 2752500 A1 | 7/2014 |
| EP | 3112488 A1 | 1/2017 |
| EP | 3550047 A1 | 10/2019 |
| JP | 2005290547 A | 10/2005 |
| JP | 2006283130 A | 10/2006 |
| JP | 2013072101 A | 4/2013 |
| JP | 2016050337 A | 4/2016 |
| WO | WO2007101921 | 9/2007 |
| WO | WO 2016/001703 A1 | 1/2016 |
| WO | WO 2016/187576 A1 | 11/2016 |
| WO | WO 2018/055425 A1 | 3/2018 |
| WO | WO 2018/162937 | 9/2018 |
| WO | WO 2018/220430 A1 | 12/2018 |
| WO | WO-2018220598 A1 * | 12/2018 ............... B21B 1/22 |
| WO | WO2019/111029 A1 | 6/2019 |

(Continued)

OTHER PUBLICATIONS

Search Report of PCT/IB2020/062004 dated Jan. 2, 2021.
Written Opinion of PCT/IB2020/062004.
Search Report of PCT/IB2019/062111 dated Feb. 17, 2021.
Written Opinion of PCT/IB2020/062111.
Search Report of PCT/IB2019/062011 dated Sep. 2, 2021.
Written Opinion of PCT/IB2020/062011.
Search Report of PCT/IB2020/062116 dated Feb. 22, 2021.

(Continued)

*Primary Examiner* — Xiaowei Su
(74) *Attorney, Agent, or Firm* — Davidson Kappel LLC

(57) ABSTRACT

A cold rolled and heat-treated steel sheet having a composition including, by weight percent C: 0.12-0.25% Mn: 3.0-8.0%, Si: 0.70-1.50%, Al: 0.3-1.2%, B: 0.0002-0.004%, S≤0.010%, P≤0.020%, N≤0.008%, the remainder of the composition being iron and unavoidable impurities resulting from the smelting, and having a microstructure consisting of, in surface fraction: between 5% and 45% of ferrite, between 25% and 85% of partitioned martensite, the partitioned martensite having a carbides density strictly less than $2 \times 10^6 / mm^2$, between 10% and 30% of retained austenite, less than 8% of fresh martensite, a part of the fresh martensite being combined with retained austenite in the shape of martensite-austenite islands in total surface fraction less than 10%.

10 Claims, No Drawings

(56) References Cited

FOREIGN PATENT DOCUMENTS

| | | |
|---|---|---|
| WO | WO 2019/123240 A2 | 6/2019 |
| WO | WO 2019/123245 A1 | 6/2019 |
| WO | WO 2021/124132 A1 | 6/2021 |
| WO | WO 2021/124199 A1 | 6/2021 |
| WO | WO 2021/124203 A1 | 6/2021 |
| WO | WO2021124136 A1 | 6/2021 |

OTHER PUBLICATIONS

Written Opinion of PCT/IB2020/062116.
Cooman De B C et al, "Quench and Partitioning Steel: A New AHSS Concept for Automotive Anti-Intrusion Applications", Steel Research International, Verlag Stahleisen Gmbh., Dusseldorf, DE, (Sep. 1, 2006), vol. 77, No. 9/10, ISSN 1611-3683, pp. 634-640.

* cited by examiner

COLD ROLLED AND HEAT-TREATED STEEL SHEET AND METHOD OF MANUFACTURING THE SAME

The present invention relates to a cold rolled high strength steel sheet having high ductility and formability and to a method to obtain such steel sheet.

BACKGROUND

To manufacture various items such as parts of body structural members and body panels for automotive vehicles, it is known to use sheets made of DP (Dual Phase) steels or TRIP (Transformation Induced Plasticity) steels.

One of the major challenges in the automotive industry is to decrease the weight of vehicles in order to improve their fuel efficiency in view of global environmental conservation, without neglecting safety requirements. To meet these requirements, new high strength steels are continuously developed by the steelmaking industry, to have sheets with improved yield and tensile strengths, and good ductility and formability.

SUMMARY OF THE INVENTION

The publication WO2019123245 describes a method to obtain a high strength and high formability cold rolled steel sheet with a yield strength YS comprised between 1000 MPa and 1300 MPa, a tensile strength TS comprised between 1200 MPa and 1600 MPa, a uniform elongation UE of at least 10%, a hole expansion ratio HER of at least 20%, thanks to a quenching & partitioning process. The microstructure of the cold rolled steel sheet consists of, in surface fraction: between 10% and 45% of ferrite, having an average grain size of at most 1.3 µm, the product of the surface fraction of ferrite by the average grain size of the ferrite being of at most 35 µm %, between 8% and 30% of retained austenite, said retained austenite having an Mn content higher than 1.1*Mn %, Mn % designating the Mn content of the steel, at most 8% of fresh martensite, at most 2.5% of cementite and the rest being partitioned martensite. A surface fraction of at least 8% of retained austenite, having a Mn content higher than 1.1*Mn %, allows obtaining a combination of high ductility and high strength.

During annealing of the hot rolled steel sheet, austenite is enriched with manganese. The annealing after cold rolling according to the present invention homogenises microstructure with finer fresh martensite and M-A islands, and therefore does not give characteristics of publication WO2019123245.

The publication WO2018220430 relates to steel sheets that are hot formed to produce parts. The steel parts are then cooled before to be reheated and maintained to a post treatment temperature and cooled to room temperature. Such a hot forming process induced intense local deformations of the steel part, because of the geometry of this part and of the forming tools, leading to local modifications of the microstructure.

It is an object of the present invention to provide a steel sheet having yield strength higher than 950 MPa, tensile strength higher than 1180 MPa, a uniform elongation higher than 10% and a hole expansion ratio HER higher than 25%.

The present invention provides a cold rolled and heat-treated steel sheet, made of a steel having a composition comprising, by weight percent:

C: 0.12-0.25%
Mn: 3.0-8.0%
Si: 0.70-1.50%
Al: 0.3-1.2%
B: 0.0002-0.004%
S≤0.010%
P≤0.020%
N≤0.008% and comprising optionally one or more of the following elements, in weight percentage:

Mo≤0.5%
V≤0.2%
Nb≤0.06%
Ti≤0.05% the remainder of the composition being iron and unavoidable impurities resulting from the smelting, said steel sheet having a microstructure consisting of, in surface fraction:

between 5% and 45% of ferrite,
between 25% and 85% of partitioned martensite, said partitioned martensite having a carbides density strictly less than $2 \times 10^6/\text{mm}^2$,
between 10% and 30% of retained austenite
less than 8% of fresh martensite,
a part of said fresh martensite being combined with retained austenite in the shape of martensite-austenite (M-A) islands in total surface fraction less than 10%.

The present invention also provides a method for manufacturing a cold rolled and heat-treated steel sheet, comprising the following successive steps:

casting a steel to obtain a semi-product, said semi product having a composition as described above,
reheating the slab at a temperature $T_{reheat}$ comprised between 1150° C. and 1300° C.,
hot rolling the reheated slab with a finish rolling temperature FRT comprises between 800° C. and 950° C. to obtain a hot rolled steel sheet,
coiling the hot rolled steel sheet at a coiling temperature $T_{coil}$ comprised between 200° C. and 700° C.,
annealing the hot rolled steel sheet at a first annealing temperature TA1 between 550° C. and 700° C., and maintaining the steel sheet at said TA1 temperature for a holding time tA1 between 30 s and 50 h,
cold rolling the hot-rolled steel sheet to obtain a cold rolled steel sheet,
reheating the cold-rolled steel sheet to a second annealing temperature TA2 above Ae3-10° C., and maintaining the steel sheet at said TA2 temperature for a holding time tA2 comprised between 1 s and 1000 s, so to obtain, upon annealing, a microstructure comprising martensite and bainite, the sum of which being greater than 80%, strictly less than 20% of ferrite, and strictly less than 20% of the sum of martensite-austenite (M-A) islands and carbides, Ae3 being calculated from the formula:

$$Ae3 = 890 - 20*\sqrt{\%\ C} + 20*\%\ Si - 30*\%\ Mn + 130*\%\ Al$$

reheating the cold rolled steel sheet to a temperature TA3 strictly lower than Ae3 and higher than (Ae1+Ae3)/2, and maintaining the steel sheet at said annealing temperature TA3 for a holding time tA3 comprised between 3 s and 1000 s, Ae1 being calculated from the formula:

$$Ae1 = 670 + 15*\%\ Si - 13*\%\ Mn + 18*\%\ Al$$

quenching the cold rolled steel sheet to a quenching temperature TQ lower than (Ms−50° C.), to obtain a quenched steel sheet, Ms being calculated from the formula:

$$Ms = 560 - (30*\%\ Mn + 13*\%\ Si - 15*\%\ Al + 12*\%\ Mo) - 600*(1 - \exp(-0.96*\%\ C))$$

reheating the quenched steel sheet to a partitioning temperature TP comprised between 350° C. and 550° C., and maintaining the quenched steel sheet at said partitioning temperature for a partitioning time comprised between 1 s and 1000 s, cooling the steel sheet to the room temperature, to obtain a cold rolled and heat-treated steel sheet

DETAILED DESCRIPTION

The invention will now be described in detail and illustrated by examples without introducing limitations.

Hereinafter, Ae1 designates the equilibrium transformation temperature below which austenite is completely unstable, Ae3 designates the equilibrium transformation temperature above which austenite is completely stable, Ms designates the martensite start temperature, i.e. the temperature at which the austenite begins to transform into martensite upon cooling. These temperatures can be calculated from a formula:

$$Ae1=670+15*\% \text{ Si}-13*\% \text{ Mn}+18*\% \text{ Al}$$

$$Ae3=890-20*\sqrt{\% \text{ C}}+20*\% \text{ Si}-30*\% \text{ Mn}+130*\% \text{ Al}$$

$$Ms=560-(30*\% \text{ Mn}+13*\% \text{ Si}-15*\% \text{ Al}+12*\% \text{ Mo})-600*(1-\exp(-0.96*C))$$

The composition of the steel according to the invention comprises, by weight percent:

According to the invention, the carbon content is comprised between 0.12% and 0.25%. Above 0.25% of addition, weldability of the steel sheet may be reduced. If the carbon content is lower than 0.12%, the retained austenite fraction is not stabilized enough to obtain a sufficient elongation and tensile strength. In a preferred embodiment, the carbon content is comprised between 0.15% and 0.25%.

According to the invention, the manganese content is comprised between 3.0% and 8.0% to obtain sufficient elongation with the stabilization of the austenite. Above 8.0% of addition, the risk of central segregation increases to the detriment of the yield strength and the tensile strength. Below 3.0%, the final structure comprises an insufficient retained austenite fraction, so that the desired combination of ductility and strength is not achieved. In a preferred embodiment, the manganese content is comprised between 3.0% and 5.0%.

According to the invention the silicon content is comprised between 0.70% and 1.50%. A silicon addition of at least 0.70% helps to stabilize a sufficient amount of retained austenite. Above 1.50%, silicon oxides form at the surface, which impairs the coatability of the steel. In a preferred embodiment, the silicon content is comprised between 0.80% and 1.30%.

The aluminium content is comprised between 0.3% and 1.2% as aluminum is a very effective element for deoxidizing the steel in the liquid phase during elaboration. The aluminium content is not higher than 1.2% to avoid the occurrence of inclusions and to avoid oxidation problems. In a preferred embodiment, the aluminium content is comprised between 0.3% and 0.8%.

The boron content is comprised between 0.0002% and 0.004% to increase the quenchability of the steel and to improve the weldability of the steel sheet. Optionally some elements can be added to the composition of the steel according to the invention.

Niobium can be added optionally up to 0.06% to refine the austenite grains during hot-rolling and to provide precipitation strengthening. Preferably, the minimum amount of niobium added is 0.0010%. Above 0.06%, yield strength and elongation are not secured at the desired level.

Molybdenum can be added up to 0.5%. Molybdenum stabilizes the retained austenite thus reducing austenite decomposition during partitioning. Above 0.5%, the addition of molybdenum is costly and ineffective in view of the properties which are required.

Vanadium can be optionally added up to 0.2% in order to provide precipitation strengthening.

Titanium can be added up to 0.05% to provide precipitation strengthening. If the titanium level is above or equal to 0.05%, yield strength and elongation are not secured at the desired level. Preferably a minimum of 0.01% of titanium is added in addition of boron to protect boron against the formation of BN.

The remainder of the composition of the steel is iron and impurities resulting from the smelting. In this respect, P, S and N at least are considered as residual elements which are unavoidable impurities. Their content is less than 0.010% for S, less than 0.020% for P and less than 0.008% for N.

The microstructure of the cold rolled and heat-treated steel sheet according to the invention will now be described. The cold rolled and heat-treated steel sheet have a microstructure consisting of, in surface fraction, between 5% and 45% of ferrite, between 25% and 85% of partitioned martensite, said partitioned martensite having a carbides density strictly less than $2\times10^6/\text{mm}^2$, between 10% and 30% of retained austenite, less than 8% of fresh martensite. A part of fresh martensite is combined with retained austenite to form martensite-austenite (M-A) islands, in total surface fraction of less than 10%. In a preferred embodiment, these M-A islands has a shape factor lower or equal to 2.

The ferrite is formed during the annealing at temperature comprised between (Ae1+Ae3)/2 and Ae3. If the ferrite fraction is lower than 5%, the uniform elongation does not reach 10%. If the ferrite fraction is higher than 45%, the tensile strength of 1180 MPa and the yield strength of 950 MPa are not achieved.

The microstructure of the cold rolled and heat-treated steel sheet comprises between 25% and 85% of partitioned martensite, to ensure high ductility of the steel, and said partitioned martensite having a carbides density strictly less than $2\times10^6/\text{mm}^2$. Partitioned martensite is the martensite formed upon cooling after the annealing then partitioned during the partitioning step. Preferably the microstructure comprises between 40% and 80% of partitioned martensite.

The microstructure of the cold rolled and heat-treated steel sheet comprises between 10% and 30% of retained austenite, to ensure high ductility of the steel and less than 8% of fresh martensite. Preferably the microstructure comprises at most 6% of fresh martensite. Fresh martensite is formed during the cooling at room temperature of the cold rolled and heat-treated steel sheet. The size of fresh martensite and martensite-austenite islands is lower than 0.7 µm.

The steel sheet according to the invention can be produced by any appropriate manufacturing method and the man skilled in the art can define one. It is however preferred to use the method according to the invention comprising the following steps:

A semi-finished product able to be further hot-rolled, is provided with the steel composition described above. The semi-finished product is heated to a temperature $T_{reheat}$ comprised between 1150° C. and 1300° C., so to makes it possible to ease hot rolling, with a final hot rolling temperature FRT comprised between 800° C. and 950° C., to obtain a hot rolled steel sheet. The maximum value of FRT is chosen in order to avoid coarsening of the austenitic grains. Preferably, the FRT is comprised between 800° C. and 910° C.

The hot-rolled steel is then cooled and coiled at a temperature $T_{coil}$ comprised between 200° C. and 700° C. Preferably, the coiling temperature is comprised from (Ms–100° C.) to 550° C.

After the coiling, the sheet can be pickled to remove oxidation.

The hot rolled steel sheet is then annealed at a first annealing temperature TA1 between 550° C. and 700° C., and maintained at said annealing temperature for a holding time tA1 between 30 s and 50 h, in order to improve the cold-rollability and the toughness of the hot-rolled steel sheet.

The hot rolled and annealed steel sheet is then cold rolled to obtain a cold rolled steel sheet having a thickness that can be, for example, between 0.7 mm and 3 mm, or even better in the range of 0.8 mm to 2 mm. The cold-rolling reduction ratio is preferably comprised between 20% and 80%. Below 20%, the recrystallization during subsequent heat-treatment is not favored, which may impair the ductility of the cold-rolled and heat-treated steel sheet. Above 80%, there is a risk of edge cracking during cold-rolling.

The cold rolled steel sheet is then reheated to a second annealing temperature TA2 above Ae3-10° C., and maintained at said TA2 temperature for a holding time tA2 comprised between 1 s and 1000 s, so to obtain, upon annealing, a microstructure comprising of martensite and bainite, the sum of which being greater than 80%, strictly less than 20% of ferrite and strictly less than 20% of the sum of martensite-austenite (M-A) islands and carbides.

The martensite of the martensite-austenite islands is fresh martensite. The martensite included in the sum of martensite and bainite greater than 80% is an auto-tempered martensite. The determination of the type of martensite can be done and quantified thanks to a Scanning Electron Microscope with a Field Emission Gun ("FEG-SEM")

The cold rolled steel sheet then undergoes a quenching and partitioning process (Q&P). The quenching and partitioning process comprises the steps of:

reheating the cold rolled steel sheet to a temperature TA3 strictly lower than Ae3 and higher than (Ae1+Ae3)/2 and maintaining the cold rolled steel sheet at said annealing temperature TA3 for a holding time tA3 comprised between 3 s and 1000 s, in order to obtain an austenitic and ferritic structure.

quenching the cold rolled steel sheet to a quenching temperature TQ lower than (Ms–50° C.), to obtain a quenched steel sheet. During this quenching step, the austenite partly transforms into martensite. If the quenching temperature is higher than (Ms–50° C.), the fraction of tempered martensite in the final structure is too low, leading to fresh martensite fraction above 8%, which is detrimental for the total elongation of the steel.

reheating the quenched steel to a partitioning temperature TP comprised between 350° C. and 550° C. and maintaining the quenched steel sheet at said partitioning temperature for a partitioning time comprised between 1 s and 1000 s before to be cooled to the room temperature.

The cold rolled and heat-treated steel sheet according to the invention has a yield strength YS higher than 950 MPa, a tensile strength TS higher than 1180 MPa, a uniform elongation UE higher than 10%, a hole expansion ratio HER higher than 25%.

Preferably, the cold rolled and heat-treated steel sheet according to the invention has YS and TS expressed in MPa, UE, total elongation TE and HER expressed in %, and silicon content % Si expressed in weight percent satisfying the following equation: (YS*UE+TS*TE+TS*HER)/% Si>65000

This equation shows the level of mechanical properties for a given silicon content.

Preferably, the total elongation TE is higher than 14%.

YS, TS, UE and TE are measured according to ISO standard ISO 6892-1. HER is measured according to ISO standard ISO 16630.

The invention will be now illustrated by the following examples, which are by no way limitative

EXAMPLES 3 grades, whose compositions are gathered in table 1, were cast in semi-products and processed into steel sheets following the process parameters gathered in table 2.

The tested compositions are gathered in the following table wherein the element contents are expressed in weight percent.

TABLE 1

| | Compositions | | | | | | | | | | | | | | |
|---|---|---|---|---|---|---|---|---|---|---|---|---|---|---|---|
| Steel | C | Mn | Si | Al | B | S | P | N | Mo | V | Nb | Ti | Ae1 (° C.) | Ae3 (° C.) | Ms (° C.) |
| A | 0.19 | 3.8 | 0.98 | 0.50 | 0.0005 | 0.002 | 0.013 | 0.003 | 0.3 | 0.15 | — | — | 644 | 852 | 337 |
| B | 0.19 | 3.9 | 1.17 | 0.39 | 0.0021 | 0.001 | 0.011 | 0.003 | 0.2 | — | 0.02 | 0.029 | 644 | 838 | 331 |
| C | 0.19 | 3.8 | 0.98 | 0.51 | 0.0005 | 0.002 | 0.013 | 0.002 | 0.3 | — | — | — | 644 | 853 | 337 |

Steels A-C are according to the invention.

Steel semi-finished products, as cast, were reheated at 1200° C., hot rolled with finish rolling temperature FRT, coiled, first heat treated at a temperature TA1, and maintaining at said TA1 temperature for a holding time ta1, before to be cold rolled. A second annealing is done at a temperature TA2, and the cold rolled steel is maintained at said TA2 temperature for a holding time ta2, before the quenching and partitioning process (Q&P), followed by a cooling at room temperature. The following specific conditions were applied:

TABLE 2

Process parameters

| | | | | First annealing | | Cold rolling | Second annealing | | | | Q&P | | |
|---|---|---|---|---|---|---|---|---|---|---|---|---|---|
| Trial | Steel | FRT (° C.) | $T_{Coil}$ (° C.) | TA1 (° C.) | tA1 (min) | ratio (%) | TA2 (° C.) | tA2 (s) | TA3 (° C.) | tA3 (s) | TQ (° C.) | TP (° C.) | t (s) |
| 1* | A | 900 | 450 | 620 | 420 | 50 | 850 | 120 | 750 | 230 | 60 | 400 | 250 |
| 2* | A | 900 | 450 | 620 | 420 | 50 | 850 | 120 | 800 | 230 | 120 | 400 | 250 |
| 3* | A | 900 | 450 | 620 | 420 | 50 | 900 | 220 | 800 | 230 | 150 | 400 | 250 |
| 4* | B | 850 | 450 | 630 | 900 | 50 | 850 | 150 | 800 | 230 | 100 | 400 | 250 |
| 5 | A | 900 | 450 | 620 | 420 | 50 | 850 | 120 | <u>710</u> | 230 | 30 | 400 | 250 |
| <u>6</u> | C | 900 | 450 | 600 | 420 | 50 | — | — | 800 | 220 | 170 | 430 | 250 |
| <u>7</u> | A | 900 | 450 | 600 | 420 | 50 | — | — | 800 | 220 | 170 | 430 | 250 |

*trials according to the invention.
Underlines values: not corresponding to the invention The annealed sheets were then analyzed and the corresponding microstructure elements before Q&P, after Q&P and mechanical properties after Q&P were respectively gathered in table 3, 4 and 5.

Microstructure of the tested samples were determined and gathered in the following table:

TABLE 3

Microstructure of the steel sheet before Q&P process

| | Microstructure before Q&P | | |
|---|---|---|---|
| Trial | F(%) | B + M(%) | MA + carbides (%) |
| 1* | 2 | 98 | 0 |
| 2* | 2 | 98 | 0 |
| 3* | 0 | 100 | 0 |
| 4* | 2 | 98 | 0 |
| 5 | 2 | 98 | 0 |
| <u>6</u> | <u>97</u> | 0 | 3 |
| <u>7</u> | <u>97</u> | 0 | 3 |

*trials according to the invention/Underlined values: not corresponding to the invention
B: stands for bainite surface fraction
F: stands for ferrite surface fraction
M: stands for martensite surface fraction
M-A: stands for martensite-austenite islands surface fraction The surface fractions are determined through the following method: a specimen is cut from the cold-rolled and heat-treated steel sheet, polished and etched with a reagent known per se, to reveal the microstructure. The section is afterwards examined through optical or scanning electron microscope, for example with a Scanning Electron Microscope with a Field Emission Gun ("FEG-SEM") at a magnification greater than 5000×, coupled to a BSE (Back Scattered Electron) device.

The determination of the surface fraction of each constituent are performed with image analysis through a method known per se. The retained austenite fraction is for example determined by X-ray diffraction (XRD).

For trials 6 and 7 which have not been annealed at a temperature TA2 during tA2, the microstructure before Q&P is the microstructure of the cold rolled steel sheet. For trials 1-5, the microstructure given before Q&P is the microstructure obtained after the second annealing.

Microstructure of the tested samples were determined and gathered in the following table:

TABLE 4

Microstructure of the steel sheet after Q&P process

| | Trial Microstructure after Q&P | | | | | | |
|---|---|---|---|---|---|---|---|
| Trials | F (%) | PM (%) | γ (%) | FM (%) | Carbides density in PM (×10⁶/mm2) | M-A islands (%) | FM and M-A size (μm) |
| 1* | 38 | 47 | 15 | 0 | 1 | 1 | 0.4 |
| 2* | 15 | 66 | 16 | 3 | 1 | 6 | 0.5 |
| 3* | 15 | 63 | 17 | 5 | 1 | 8 | 0.5 |
| 4* | 20 | 64 | 16 | 0 | 1 | 1 | 0.4 |
| 5 | <u>52</u> | 28 | 20 | 0 | 1 | 1 | 0.4 |
| <u>6</u> | 15 | 57 | 16 | <u>12</u> | 2 | <u>20</u> | <u>1</u> |
| <u>7</u> | 15 | 48 | 17 | <u>20</u> | 1 | <u>15</u> | <u>12</u> |

*trials according to the invention/Underlined values: not corresponding to the invention
γ: stands for residual austenite surface fraction
PM: stands for partitioned martensite surface fraction
FM: stands for fresh martensite surface fraction
F: stands for ferrite surface fraction
M-A: stands for martensite-austenite islands surface fraction Thanks to the second annealing, there is a more homogeneous microstructure with fine fresh martensite and M-A islands, with a size lower than 0.7 μm. On the contrary, trials 6 and 7 in which there is no second annealing, and therefore there is a more significant enrichment of Mn in austenite, which forms more than 10% of larger fresh martensite and M-A islands with a more heterogeneous size distribution.

Mechanical properties of the tested samples were determined and gathered in the following table:

TABLE 5

Mechanical properties of the cold rolled and heat-treated steel sheet after Q&P process

| Trial | YS (MPa) | TS (MPa) | UE (%) | HER (%) | TE (%) | (YS*UE + TS*TE + TS*HER)/% Si |
|---|---|---|---|---|---|---|
| 1* | 1065 | 1276 | 13 | 28 | 16 | 71417 |
| 2* | 1173 | 1328 | 12 | 32 | 16 | 79408 |
| 3* | 1092 | 1322 | 10 | 32 | 14 | 73196 |
| 4* | 1221 | 1355 | 12 | 43 | 15 | 79694 |
| 5 | <u>762</u> | 1254 | 14 | n.a | 18 | <u>33918</u> |
| <u>6</u> | 1155 | 1323 | <u>9</u> | <u>19</u> | 12 | <u>52457</u> |
| <u>7</u> | 1132 | 1351 | 10 | <u>7</u> | 13 | <u>39133</u> |

*trials according to the invention
Underlined values: do not match mechanical properties.
n.a: non-assessed value The examples show that the steel sheets according to the invention, namely examples 1-4 are the only one to show all the targeted properties thanks to their specific composition and microstructures.

In trial 5, steel A is hot rolled, coiled, annealed a first time and cold rolled before to be annealed a second time according to the invention. During the quenching & partitioning step, the steel is heated to a low temperature TA3, limiting austenite and therefore favorizing ferrite during cooling. The yield strength of the final steel sheet is then below 950 MPa and the equation (YS*UE+TS*TE+TS*HER)/% Si does not achieved 65000.

In trials 6 and 7, steels C and A respectively are not reheating before the quenching & partitioning process. The microstructure before Q&P is 97% ferritic, leading to a high content of fresh martensite after Q&P. This high fraction of large-sized fresh martensite lead to a hole expansion ratio lower than 25%, and so to an equation (YS*UE+TS*TE+TS*HER)/% Si lower than 65000.

What is claimed is:

1. A cold rolled and heat-treated steel sheet, made of a steel having a composition comprising, by weight percent:
C: 0.12-0.25%
Mn: 3.0-8.0%
Si: 0.70-1.50%
Al: 0.3-1.2%
B: 0.0002-0.004%
S≤0.010%
P≤0.020%
N≤0.008%
and optionally one or more of the following elements, in weight percentage:
Mo≤0.5%
V≤0.2%
Nb≤0.06%
Ti≤0.05%
a remainder of the composition being iron and unavoidable impurities resulting from processing;
the steel sheet having a microstructure consisting of, in surface fraction: between 5% and 45% of ferrite; between 25% and 85% of partitioned martensite, the partitioned martensite having a carbides density strictly less than $2 \times 10^6/mm^2$; between 10% and 30% of retained austenite; and less than 8% of fresh martensite, a part of the fresh martensite being combined with retained austenite in the shape of martensite-austenite (M-A) islands in total surface fraction of 1% to less than 10%, and wherein fresh martensite and martensite-austenite islands size are less than 0.7 µm, the steel sheet having a yield strength YS expressed in MPa, a tensile strength TS expressed in MPa, a uniform elongation UE expressed in %, a total elongation TE expressed in %, a hole expansion ratio HER expressed in %, and a silicon content expressed in weight percent satisfying the following equation:

(YS*UE+TS*TE+TS*HER)/% Si>65000.

2. The cold rolled and heat-treated steel sheet as recited in claim 1 wherein the manganese content is comprised between 3.0% and 5.0%.

3. The cold rolled and heat-treated steel sheet as recited in claim 1 wherein the silicon content is comprised between 0.80% and 1.30%.

4. The cold rolled and heat-treated steel sheet as recited in claim 1 wherein the microstructure includes at most 6% of fresh martensite.

5. The cold rolled and heat-treated steel sheet as recited in claim 1 wherein the yield strength YS is higher than 950 MPa.

6. The cold rolled and heat-treated steel sheet as recited in claim 1 wherein the tensile strength TS is higher than 1180 MPa.

7. The cold rolled and heat-treated steel sheet as recited in claim 1 wherein the uniform elongation is higher than 10%.

8. The cold rolled and heat-treated steel sheet as recited in claim 1 wherein the hole expansion ratio is higher than 25%.

9. The cold rolled and heat-treated steel sheet of claim 1, wherein the steel has a composition consisting of, by weight percent:
C: 0.12-0.25%
Mn: 3.0-8.0%
Si: 0.70-1.50%
Al: 0.3-1.2%
B: 0.0002-0.004%
S≤0.010%
P≤0.020%
N≤0.008%
and optionally one or more of the following elements, in weight percentage:
Mo≤0.5%
V≤0.2%
Nb≤0.06%
Ti≤0.05%
a remainder of the composition being iron and unavoidable impurities resulting from processing.

10. A method for manufacturing a cold rolled and heat-treated steel sheet, comprising the following successive steps:
casting a steel to obtain a semi-finished product having a composition comprising, by weight percent:
C: 0.12-0.25%
Mn: 3.0-8.0%
Si: 0.70-1.50%
Al: 0.3-1.2%
B: 0.0002-0.004%
S≤0.010%
P≤0.020%
N≤0.008%
and optionally one or more of the following elements, in weight percentage:
Mo≤0.5%
V≤0.2%
Nb≤0.06%
Ti≤0.05%
a remainder of the composition being iron and unavoidable impurities resulting from processing;
reheating the semi-finished product at a temperature $T_{reheat}$ between 1150° C. and 1300° C.;
hot rolling the reheated semi-finished product with a finish rolling temperature FRT between 800° C. and 950° C. to obtain a hot rolled steel sheet;
coiling the hot rolled steel sheet at a coiling temperature $T_{coil}$ between 200° C. and 700° C.;
annealing the hot rolled steel sheet at a first annealing temperature TA1 between 550° C. and 700° C., and maintaining the steel sheet at the TA1 temperature for a holding time tA1 between 30 s and 50 h;
cold rolling the hot-rolled steel sheet to obtain a cold rolled steel sheet;
reheating the cold-rolled steel sheet to a second annealing temperature TA2 above Ae3-10° C., and maintaining the steel sheet at the TA2 temperature for a holding time tA2 between 1 s and 1000 s, so to obtain, upon annealing, a microstructure comprising martensite and bainite, the sum of the martensite and bainite being greater than 80%, strictly less than 20% of ferrite, and strictly less than 20% of a sum of martensite-austenite (M-A) islands and carbides, Ae3 being calculated from the formula:

$$Ae3 = 890 - 20 * \sqrt{\% C} + 20 * \% Si - 30 * \% Mn + 130 * \% Al$$

reheating the cold rolled steel sheet to a temperature TA3 strictly lower than Ae3 and higher than (Ae1+Ae3)/2, and maintaining the steel sheet at said annealing temperature TA3 for a holding time tA3 comprised between 3 s and 1000 s, Ae1 being calculated from the formula:

$$Ae1 = 670 + 15 * \% Si - 13 * \% Mn + 18 * \% Al$$

quenching the cold rolled steel sheet to a quenching temperature TQ lower than (Ms-50° C.), to obtain a quenched steel sheet, Ms being calculated from the formula:

$$Ms = 560 - (30 * \% Mn + 13 * \% Si - 15 * \% Al + 12 * \% Mo) - 600 * (1 - \exp(-0.96 * \% C))$$

reheating the quenched steel sheet to a partitioning temperature TP comprised between 350° C. and 550° C., and maintaining the quenched steel sheet at said partitioning temperature for a partitioning time comprised between 1 s and 1000 s; and cooling the steel sheet to the room temperature, to obtain the cold rolled and heat-treated steel sheet as recited in claim 1.

* * * * *